(12) United States Patent
Shek et al.

(10) Patent No.: US 11,556,718 B2
(45) Date of Patent: Jan. 17, 2023

(54) ALTERING MESSAGING USING SENTIMENT ANALYSIS

(71) Applicant: International Business Machines Corporation, Armonk, NY (US)

(72) Inventors: Elinna Shek, Ashburn, VA (US); David Kenneth Sagal, II, Keyser, WV (US); Michael Drzewucki, Woodbridge, VA (US); James M Dixius, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 17/246,634

(22) Filed: May 1, 2021

(65) Prior Publication Data

US 2022/0350971 A1  Nov. 3, 2022

(51) Int. Cl.
| | |
|---|---|
| *G06F 17/00* | (2019.01) |
| *G06F 40/30* | (2020.01) |
| *G06F 40/166* | (2020.01) |
| *G06V 40/16* | (2022.01) |
| *G06V 40/20* | (2022.01) |

(52) U.S. Cl.
CPC ............ *G06F 40/30* (2020.01); *G06F 40/166* (2020.01); *G06V 40/168* (2022.01); *G06V 40/174* (2022.01); *G06V 40/28* (2022.01)

(58) Field of Classification Search
CPC ..... G06F 40/30; G06F 40/166; G06V 40/168; G06V 40/174; G06V 40/28
See application file for complete search history.

(56) References Cited

U.S. PATENT DOCUMENTS

| | | | | |
|---|---|---|---|---|
| 8,516,105 | B2* | 8/2013 | Chawla | H04N 7/15 |
| | | | | 709/224 |
| 9,413,891 | B2* | 8/2016 | Dwyer | H04M 3/42221 |
| 10,860,985 | B2* | 12/2020 | Nelson | G06Q 10/10 |
| 2005/0209848 | A1 | 9/2005 | Ishii | |
| 2011/0313767 | A1* | 12/2011 | Duffield | G10L 15/187 |
| | | | | 704/E15.001 |
| 2014/0337097 | A1* | 11/2014 | Farlie | G06Q 30/0203 |
| | | | | 705/7.32 |
| 2015/0195406 | A1* | 7/2015 | Dwyer | G06F 40/279 |
| | | | | 379/265.07 |
| 2015/0286627 | A1* | 10/2015 | Chang | G06F 40/205 |
| | | | | 704/9 |
| 2017/0132518 | A1 | 5/2017 | Kitada | |

(Continued)

OTHER PUBLICATIONS

Abercrombie et al., "'Aye' or 'No'? Speech-level Sentiment Analysis of Hansard UK Parliamentary Debate Transcripts", 8 pps, 2018, <https://www.aclweb.org/anthology/L18-1659.pdf>.

(Continued)

*Primary Examiner* — Laurie A Ries
(74) *Attorney, Agent, or Firm* — David K. Mattheis; Maeve M. Carpenter

(57) ABSTRACT

Altering messaging according to sentiment analysis by providing a baseline messaging tree including topics arranged according to a sentiment score, providing speaker prompts according to the baseline messaging tree, receiving real-time audience sentiment feedback during a messaging presentation, and adjusting the speaker prompts according to the baseline messaging tree and the real-time audience sentiment feedback.

20 Claims, 4 Drawing Sheets

(56) References Cited

U.S. PATENT DOCUMENTS

| | | | |
|---|---|---|---|
| 2018/0260825 A1 | 9/2018 | Rashid | |
| 2019/0026786 A1* | 1/2019 | Khoury | G06Q 30/0271 |
| 2019/0245973 A1* | 8/2019 | Dwyer | G06F 40/279 |
| 2020/0252355 A1* | 8/2020 | Peltier | G06F 40/295 |
| 2020/0265195 A1* | 8/2020 | Galitsky | G06F 40/253 |
| 2020/0342895 A1* | 10/2020 | Jung | G10L 15/26 |
| 2021/0076002 A1* | 3/2021 | Peters | H04N 7/152 |
| 2021/0216721 A1* | 7/2021 | Gunturi | G06F 16/345 |
| 2021/0295186 A1* | 9/2021 | Hajiyev | G06F 16/90335 |
| 2021/0374671 A1* | 12/2021 | Li | G06N 3/0445 |
| 2022/0012428 A1* | 1/2022 | Avedissian | G06N 3/04 |
| 2022/0139376 A1* | 5/2022 | Buesser | G10L 15/08 |
| | | | 704/275 |
| 2022/0284051 A1* | 9/2022 | Schissel | G06F 16/243 |

OTHER PUBLICATIONS

Fulse et al., "A survey of multimodal sentiment analysis", International Journal of Engineering Research & Technology (IJERT) ISSN: 2278-0181, 6 pps., vol. 3 Issue 11, Nov. 2014, <https://www.ijert.org/research/a-survey-on-multimodal-sentiment-analysis-IJERTV3IS111169.pdf>.

Mell et al., "The NIST Definition of Cloud Computing", National Institute of Standards and Technology, U.S. Department of Commerce, NIST Special Publication 800-145, Sep. 2011, 7 pages.

Müller et al., "Detecting Low Rapport During Natural Interactions in SmallGroups from Non-Verbal Behaviour", Jan. 8, 2018, 12 pps., <https://arxiv.org/pdf/1801.06055.pdf>.

\* cited by examiner

ALTERING MESSAGING USING SENTIMENT ANALYSIS

FIELD OF THE INVENTION

The disclosure relates generally to using sentiment analysis to alter messaging. The disclosure relates particularly to altering the messaging flow of a speech according to analysis of audience sentiment.

BACKGROUND

Individual sentiment may be analyzed using facial expression, posture, and hand gesture data associated with the individual. The average or aggregate sentiment of a listening audience may be determined using similar data gathered for audience members.

Decision trees enable a mapping of potential decisions along a planned timeline enabling the progression of activities along one of a plurality of preplanned paths according to input data values at runtime for each decision node of the tree.

In presenting a message to an audience, maintaining audience engagement to the messaging and managing audience receptivity to upcoming messaging topics may depend upon the sentiment of the audience to current messaging topics and transitioning to new topics according to the current and desired sentiments. Successfully calling an audience to an action may depend upon the real-time sentiment of the audience regarding being called to action.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable altering messaging according to sentiment analysis.

Aspects of the invention disclose methods, systems and computer readable media associated with altering messaging according to sentiment analysis by providing a baseline messaging tree including topics arranged according to a sentiment score, providing speaker prompts according to the baseline messaging tree, receiving real-time audience sentiment feedback during a messaging presentation, and adjusting the speaker prompts according to the baseline messaging tree and the real-time audience sentiment feedback.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
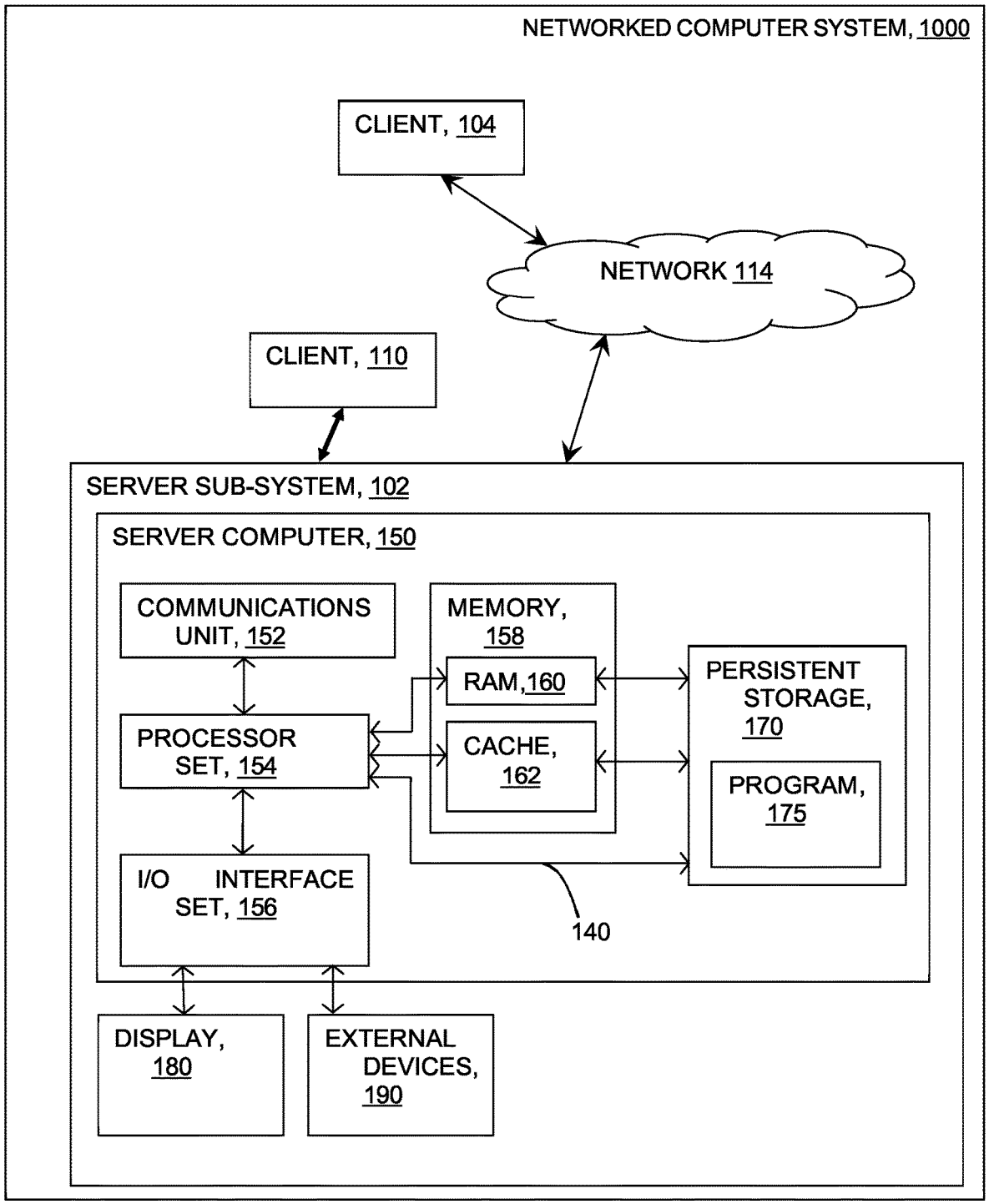
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

When delivering a message to an audience, it is difficult to read the sentiment of the crowd and know if the method of delivery should be altered to better reach/influence the crowd. For an informational messaging presentation, loss of engagement with the audience results in a failure to inform the audience on the presentation topic(s). For a persuasive presentation, loss of engagement with the audience, or a shift from a positive engagement to a negative engagement with the audience, results in a failure to persuade the audience as any call to action presented by the speaker falls on an unmotivated or hostile audience.

Current technology analyzes speech transcripts ahead of the delivery using text mining, sentiment analysis, focus groups, manually annotating sentiment labels, etc. Various regions and areas of the country may respond better to key words and phrases (e.g. dialects, political viewpoints, etc.) and the speaker would make a better connection with the audience if those words or phrases were used correctly in the context of the speech. Disclosed embodiments monitor the sentiment of the audience by analyzing the crowd in real-time and provide data to modify a speech tree to ensure the best reception possible of the desired or intended message. By monitoring the sentiment experienced or expressed by the crowd, disclosed embodiments adjust the teleprompter speech and speech tree to incorporate words, phrases, or specific topics better suited for the specific region and for the particular crowd.

Aspects of the invention provide an improvement in the technical field of automated teleprompter speech prompt delivery. Conventional teleprompters provide time-based speech prompts, manual prompts where the speaker or another individual control the flow of prompts or provide speech prompts according to what the speaker has said and providing the prompts that follow the current speech portion. Such systems follow a single predefined series of speech prompts without regard to the reception by the audience to the real-time speech content. A manual system controlled by another party may enable that party to alter the flow of the speech and to shift to an alternative series of prompts, according to a perceived reaction by the audience, but the alterations to the flow do not occur automatically. Disclosed embodiments automate the presentation of speech prompts according to real-time analysis of audience sentiment with regard to current messaging. Such embodiments provide a decision tree organized according to historic audience sentiment data, receive and analyze audience reaction data to identify current audience sentiment, and alter the real-tie messaging using the decision tree and the real-time sentiment data.

In many cases, users have data in advance that tells them how an audience may respond to the various messaging portions and topics of a messaging presentation. As a result, a baseline speech decision tree may be constructed setting forth the various options for the presentation of the desired messaging in terms of the historic receptivity of similar audiences to the speech topics. The topic and messaging portion sequence options of the decision tree may be ordered according to the historic sentiment data providing for the initial presentation of a high scoring topic to engage the audience, followed by less high scoring topics, presented with the hope of benefitting from the early audience engagement and building an increased sentiment scoring for the topic, followed by additional topics ordered according to the historic sentiment data and ending the presentation with another high scoring topic, or returning to the original high scoring topic to yield a memorable finish for the presentation.

As the presentation progresses, the embodiments present the planned sequence of speech prompts from the decision tree. Analysis of real-time audience reaction data including facial expression data, enable the determination of an audience sentiment score associated with the current messaging topic and phrasing presentation. As the presentation progresses, methods compare the real-time audience sentiment from the audience feedback data with the expected sentiment scoring from the historic data. At decision points along the tree, the method alters the messaging prompts according to the comparison. For instance, where the predicted scoring matches the real-time scoring, the method maintains the original planned progression of the messaging topics. For instances where the real-time data indicates a sentiment scoring less than the predicted scoring, the method presents an alternative sequence of prompts, shifting topics and/or altering messaging phrasing in response to shifts in audience reactions.

Aspects of the invention also provide an improvement to computer functionality. In particular, implementations of the invention relate to a specific improvement to the way automated teleprompters operate, embodied in the continually adjusted speech prompts according to a speech decision tree and an ongoing analysis of the audience sentiment. In embodiments, the system adjusts the speech prompts provided upon the teleprompter as the speech progresses according to the decision tree and the analyzed sentiments identified in the reaction of the audience to the previous portion of the speech/messaging.

The sentiment analysis and the real-time presentation of the messaging continue hand in hand. The disclosed embodiments shift topics and phrasing associated with each presented topic according to the real-time sentiment shown by the receiving audience members.

In an embodiment, one or more components of the system can employ hardware and/or software to solve problems that are highly technical in nature (e.g., providing a messaging decision tree including potential messaging topics arranged according to potential presentation paths with each topic having a sentiment score, providing speaker prompts using the decision tree, receiving and analyzing real-time audience member feedback, including facial expression data, hand gesture data and audience member posture data, adjusting the path through the decision tree and the associated speaker prompts according to the audience sentiments identified from the real-time audience member feedback data, etc.). These solutions are not abstract and cannot be performed as a set of mental acts by a human due to the processing capabilities needed to facilitate automated messaging presentation according to audience sentiment, for example. Further, some of the processes performed may be performed by a specialized computer for carrying out defined tasks related to automated adjustment of messaging presentations. For example, a specialized computer can be employed to carry out tasks related to automatically adjusting speech prompts for messaging presentations according to audience sentiment analysis, or the like.

In an embodiment, a user provides the text of a planned speech to the sentiment analyzer system. The provided speech text may be annotated in terms of speech topics. The system parses the speech text into speech topics and phrases using a natural language processing (NLP) machine learning model as well as provided speech annotations regarding topics. The system determines a baseline sentiment score for each phrase and topic according to historical sentiment data associated with the delivery of the phrases and topics, as well as sentiment data gathered from external sources such as on-line chatbot conversations, transcriptions of call center logs, audio and/or video recordings of past speeches and presentation, etc. Historic data includes attributes such as audience size and demographic compositions, venue type and actual venue, time of day, day of the week, etc. The baseline sentiment score may vary from a low score of one, indicating the most negative sentiment, to a high score of one hundred, indicting the most positive sentiment. A sentiment of fifty represents a neutral or average sentiment.

In an embodiment, a method assembles a plurality of phrase and topic sequences for the provided speech text. In this embodiment, the method compiles alternate wording and phrases for at least some of the original speech text phrases. The method determines potential alternative wording and phrases using intents and entities assigned to the original wording and phrases by the NLP and substituting alternative words and phrases having the same intent, or a similar interchangeable entity taken from a dictionary and/or thesaurus. In this embodiment, the method considers the geographic location of the target audience and any local or regional dialect features in selecting alternative words and phrases. In this embodiment, the method considers local cultural references, dialects, accents, and colloquialisms in assembling alternative wording and phrases. For each alternative sequence of wording and phrases, the method determines a predicted baseline sentiment scoring using historic and external data sources as described above.

In an embodiment, the method assembles alternative orderings of the original speech text according to topic. As an example, the method considers the original topic sequence of A-B-C-D, as well as alternative sequences such as A-C-B-D, B-C-D-A, and other sequences of the original speech topics. For each sequence and each assembled sequence of wording and phrases for the topics of the sequences, the method determines a predicted baseline sentiment for the speech as whole. In this embodiment, the method provides an initial output of assembled sequences ranked according to predicted baseline sentiment sequence for the target audience. In this embodiment, the method receives user input selecting one of the provided output sequences, or automatically selects the sequence having the highest predicted baseline sentiment score.

The method translates the selected sequence into a corresponding set of teleprompter speech prompts for the sequence. In an embodiment, the speech prompts include pronunciation cues for words from a local dialect and having a local accented pronunciation.

In an embodiment, the method assembles a decision tree according to the selected sequences. The initial decision tree comprises the selected sequences of speech prompts in the assembled order. The decision tree further includes decision nodes associated with the ordered speech prompt sequences. Each decision node corresponds to a particular point in the progression along the potential sequences of speech prompts—corresponding to a point in the messaging presentation by the speaker. For example, decision nodes correspond to an early point in each presentation topic, as well as corresponding to any sub-topics of each main topic, as a gauge of the receptivity of the audience to that topic and/or sub-topic, decision nodes correspond to any mention of the next planned presentation topic, as an indication of the receptivity to the transition to the new topic, decision nodes associated with the use of local dialect or colloquialisms to gauge the receptivity of the audience to that use, decision nodes associated with any attempt at humor to gauge the success or failure of the attempt, decision nodes associated with the specific mention of any individual or other entity, etc.

In an embodiment, the method defines an early decision node for each topic using NLP of the speech prompt sequences for the topic. In this embodiment, the method defines the early decision node according to a defined number of sentences for the topic. In an embodiment, the method defines the early decision node according to a defined number of NLP identified intents for the topic.

Each decision node relates to a comparison between the predicted baseline sentiment associated and a real-time audience sentiment score determined by the method. For each decision node, the method selects the next sequence of speech prompts according to the comparison between the current real-time sentiment and the predicted baseline sentiment. As an example, the method predicts a baseline sentiment score of seventy-five for topic A according to historic and external data sources. At decision node 1, corresponding to speech prompts early in the sequence for topic A, the method provides options for proceeding according to the sentiment score comparison. Options may include proceeding according to the original selected speech text as the real-time score matches the predicted score, shifting to past/historic statements associated with the topic and having high sentiment scores in an effort to win the audience back to a favorable view of the topic, or shifting early to the topic A closing remarks as the real-time score falls below the predicted sentiment score.

As an example, in response to an early unfavorable sentiment score for a topic, the system will present the speaker with another set of speech prompts, within the topic, from historical data that have proven to be of high sentiment, to deliver. If the sentiment of the audience is still negative upon this delivery, then the speech switches topic. For the branch including shifting early to closing out topic A, the decision tree further includes another node 1A, for speech prompts introducing the next planned topic, for example topic B, and gauging the audience sentiment for topic B compared to the predicted baseline sentiment. In this embodiment, real-time data at or exceeding the predicted sentiment for topic B results in closing topic A and shifting to topic B. Real-time sentiment data less than the predicted level leads to decision node 1B associated with the introduction of planned topic C, and so on until reaching a decision node where the real-time sentiment data meets or exceeds the predicted sentiment data, and proceeding with the defined speech prompt sequence corresponding to that comparison result.

In an embodiment, one or more decision nodes relate to the use of local reference, dialects, accents or colloquialisms. In this embodiment, the method determines the sentiment of the audience for any such use and alters the speech prompt sequencing accordingly. For example, positive reception of such a use leads to speech prompt sequences including additional such uses. Negative reception of the use leads to sequences excluding further such uses.

In an embodiment, the decision tree includes iterative sequencing to broach topics bypassed due to low real-time scoring again in the alternative sequence as a possible next topic. In this embodiment, decision nodes determine the sequence of speech prompts going forward.

In an embodiment, decision nodes include multiple thresholds and multiple possible speech prompt sequences for proceeding. In this embodiment, real-time sentiment scoring, matching or exceeding the predicted baseline sentiment score, corresponds to continuing along the originally planned sequence of prompts or shifting to a first alternative sequence according to real-time scores falling below the first threshold. The decision nodes also include another speech prompt sequence option for real-time sentiment scores well above the predicted baseline score. This speech prompt sequence corresponds to a more controversial topic or subtopic to be presented to a highly receptive audience, as indicated by the well above the predicted baseline sentiment real-time scoring. In an embodiment, the decision node further includes a sequence of speech prompts associated with a real-time sentiment score well below the predicted baseline sentiment score. In this embodiment, the sequence of speech prompts includes deprecating humor directed toward the topic associated with the real-time sentiment score well below the predicted baseline sentiment scoring.

In an embodiment, the method and system include lower thresholds for decision point values to accommodate prediction errors. As an example, a decision point using a predicted score of seventy-five includes a lower threshold of 10, such that real-time sentiment scoring data of sixty-five or greater will be seen as satisfying the decision point criteria for proceeding according to the original sequence from that point on.

In an embodiment, the system and method receive real-time audience feedback data and determine real-time audience sentiment scores from that data. One or more cameras capture images of the audience members and provide the real-time audience feedback data to the audience feedback data processing elements of the disclosed embodiments. Real-time audience feedback data includes facial expression data, hand gesture data, and audience member posture data. In an embodiment, the real-time audience feedback data also includes text data gathered from the real-time social media account postings of participating audience members who have opted into public access to their social media accounts. In an embodiment, audience feedback data further includes audio data gathered from the real-time audience members using microphone. Analysis of the real-time audio includes speech to text conversion and sentiment analysis using NLP or similar algorithms.

In an embodiment, analysis of the real-time audience feedback data includes the use of one or more machine learning classification models trained using annotated audience feedback data labeled according to audience member sentiment. The method classifies and identifies audience member sentiment from facial expression data without any need to perform facial recognition upon the facial image data. The method utilizes classification model architectures such as convolutional neural networks (CNNO or recurrent neural networks (RNNO or generative classifiers such as Variational Autoencoders (VAE) or generative adversarial networks (GAN) to identify the sentiments in the audience feedback data. The trained model provides an output identifying the audience member sentiments identified in the provided data as well as confidence levels associated with each identified sentiment and the approximate percentage of the audience exhibiting each identified sentiment.

Audience text data incudes speech to text, or other transcriptions of recordings of audience audio from previous presentations and speeches. Analysis of audience text data includes the use of NLP or natural language understanding (NLU) models for extracting audience member sentiment scores from the textual content.

For audiences exhibiting multiple potentially conflicting sentiments, the decision nodes of the decision tree function as described above utilizing the percentage of the audience associated with each potential sentiment, as determined by the classification model in making the decision.

In an embodiment, in real-time, the method and system track the progression of the speaker's presentation of the messaging portions and follow the decision tree nodes corresponding to the presentation speech prompts. As the method determines the real-time sentiment scoring for each decision node, the method selects the speech prompt sequence associated with the comparison for that decision node and continues presenting speech prompts according to the decision node selected speech prompt sequencing.

In an embodiment, the method receives audio data associated with the real-time presentation by the speaker. The method uses speech-to-text, alone or in combination with an NLP algorithm, to monitor the speaker's presentation relative to the provided speech prompts. In this embodiment, the method determines that the speaker has stopped following the provided speech prompts, either continuing with the original sequence, or otherwise altering the speech presentation sequence themselves. The method identifies the current location of the speakers presentation within the decision tree and resumes using the decision tree to determine the speech prompt sequence for presentation upon the teleprompter form that point onward. Any time the speaker deviates from the presented speech prompt, the method identifies the current speech segment using the speech-to-text data, and resume utilization of the decision tree according to the identified speech prompts.

In an embodiment, the system and method record the speaker's messaging presentation, or receive a recording of the presentation. The method appends the audience sentiment data along with geographic information associated with and extracted from the recording to the training data used by the machine learning model classifier as well as to the historic audience sentiment data associated with the presentation messaging topics.

In an embodiment, capture and analysis of the real-time audience feedback data begins prior to the beginning of the speaker's presentation. In this embodiment, the decision tree includes one or more decision nodes associated with the time period before the presentation and the selection of opening remarks according to the real-time sentiment scoring for the audience prior to the beginning of the speech.

EXAMPLES

For this example, a method receives prepared speech text including a topic snippet, a full speech, and closing statements for each of topics A, B, and C, of a complete speech. The sentiment analyzer of the method analyses each topic according to historical data and external data sources and returns output sentiment scores of eighty for topic A, sixty for topic B, and fifty for topic C. The method selects a topic sequence in descending order of sentiment score: A—80, B—60, and C—50.

During presentation of topic A, the method gathers and analyzes real-time audience feedback data to determine real-time audience sentiment scores for the presented messaging content. The method gathers video, audio and textual data from audience members. According to the decision tree, the method presents the speech prompts for closing topic A after the sentiment scores drop below a defined threshold, either the predicted baseline sentiment or a user defined threshold associated with the predicted baseline sentiment value, or in an embodiment, any sentiment score below a fixed threshold, such as forty, indicating a lack of positive audience sentiment toward the content and/or the speaker.

After closing topic A, the method presents the speech prompts for the snippet of topic B. Depending upon the sentiment scoring in response to the snippet, the method proceeds with presenting the remainder of the topic B speech prompts, or closes topic B and presents the snippet of topic C— the next highest predicted baseline sentiment scoring topic.

In a second example, a sentiment analyzer component base lines the sentiment of a provided speech transcript prior to audience engagement. The method constructs a baseline speech messaging tree of original and alternative words and phrases using speech information gathered from external sources such as chatbots, forums, historical record of the speech, recorded transcriptions (e.g. from call centers) along with the curated speech for delivery.

In an embodiment, the method assembles different wording, phrases, topics and their baseline sentiments. Alternatives include adjustments to the speech to include a regional dialect based on geolocation of delivery and external sources.

In an embodiment, the method sets up a speech decision tree of phrases and topics based upon predicted audience sentiment. The method then uses the speech messaging decision tree to route the speaker through the phrases and topics based on received real-time sentiment from the crowd.

In an embodiment, the method analyzes audience feedback data and records a sentiment score between one and one hundred. One being the lowest and most negative, fifty neutral, one hundred being the highest and most positive.

In an embodiment, the topic transition component of the system and method engage when the method receives sentiment data indicating a shift in real-time audience sentiment away from the predicted audience sentiment, or a negative trend in the real-time audience sentiment. E.g., the system sentiment analyzes audience sentiment and determines a score of fifty before the speech begins. Topic A appears to be controversial, indicated by a sentiment score dip to forty. The topic transition component provides a smooth transfer to topic D from topic A in real-time during the speech by adjusting the speech prompts presented according to the speech decision tree component.

In an embodiment, a topic selector and routing component selects topics to discuss and potential transition topics if sentiment scores become negative. For example—Topics A, B, and C will be covered in the speech. Topics D and E are additional topics to transition to if any of the primary topics receive a negative result in sentiment score. The method positions topics D and E sequentially based on baseline sentiment score. If an initial topic receives a negative scoring trend or score results below a threshold, the method delivers snippets of topic D, for example, to gauge crowd sentiment. If topic D receives positive sentiment then the speech path continues down that path, presenting topic D speech prompts; otherwise the method delivers snippets of topic E to gauge sentiment analysis, and so on.

In an embodiment, an interpersonal language component adjusts speech to use one or more regional dialects. The method also receives sentiment scores for the use of a regional dialect and adjusts dialect use based on the sentiment analysis of the audience response when regional words or phrases are spoken. For example—the speaker is not from the local region and the method adjusts speech content to use a local phrase. The impact to the sentiment score is negative when the phrase is used. The method then modifies the speech to remove future prompts using that local phrase. The system and method save the audience response to use of the local phrase for future use in deriving baseline sentiment cores and messaging trees for future messaging presentations.

In an embodiment, a crowd sentiment analyzer gathers the sentiment of the crowd before the presentation begins and continues to poll for audience sentiment changes throughout the speech. In this embodiment, the method checks for negative or positive shifts in audience sentiment and determines a real-time sentiment score correlated to audience reactions to the presented speech phrases and topics. In an embodiment, the system and method record the presentation and audience responses for use training the sentiment analyzer, for determining baseline sentiment scores for future presentation messaging sequences, and configuring the speech decision tree for future presentations.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise presentation sequencing program (not shown) together with sufficient computing resource (processor, memory, network communications hardware) to execute the program. Network 114 may further provide access to external data sources such as social media networks providing access to the social media posting of audience members during real-time presentations by a speaker.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the presentation sequencing program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., presentation sequencing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
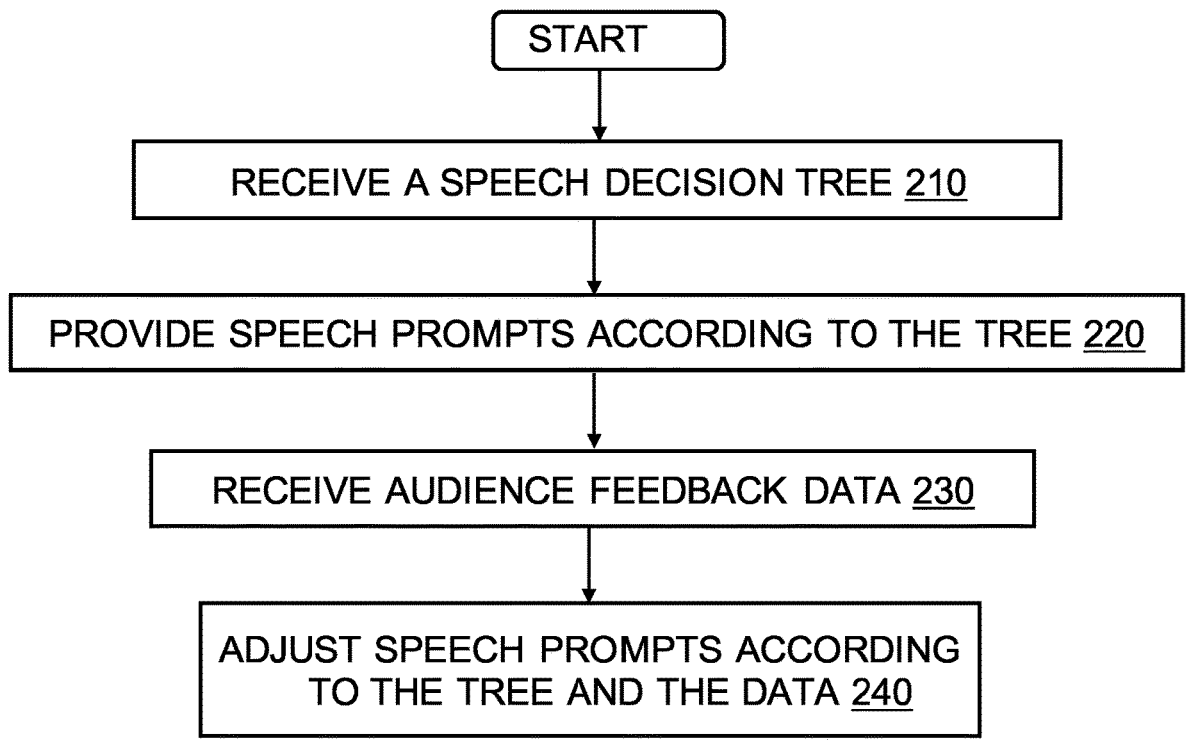
FIG. 2 provides a flowchart depicting an operational sequence, according to an embodiment of the invention.

FIG. 2 provides a flowchart 200, illustrating exemplary activities associated with the practice of the disclosure. After program start, at block 210, the method executing through the computing environment of FIG. 1, and presentation sequencing program 175, receives a speech decision tree for a planned speech. In an embodiment, the method receives the text of a planned speech. The method analyzes the planned text, determines predicted baseline sentiment scores for the portions of the planned text and constructs a speech decision tree using the predicted sentiment scores. The planned text may be arranged in descending order according to the predicted scores, may be arranged in ascending order according to the scores or arranges otherwise using the scores. The method provides the constructed decision tree for further use in sequencing presentation portions according to audience feedback data.

The method translates the presentation portions as a sequence of teleprompter speech prompts using the speech decision tree. The system provides the initial speech prompts to a speaker using a teleprompter at block 220.

At lock 230, the system and method receive real-time audience feedback data and determines real-time audience sentiment with respect to the presented messaging portions. The audience feedback data may include image data of audience members faces, hands, and bodies as well as audio data from the audience and text data from audience member social media postings related to the presentation. The method determines the real-time sentiment scoring for presented portions using the data. The method provides the real-time sentiment data for use with the speech decision tree.

At block 240, the method of presentation sequencing program 175 adjusts the sequencing of the speech prompts according to the decision tree and the real-time audience sentiment scores. For presentations having accurately predicted baseline sentiments, the method presents the original sequence of speech prompts to the speaker. For other instances, the method adjusts the sequence according to the speech decision tree as the audience sentiment changes to alter the trend of the audience sentiment and provide a better communications outcome from the messaging presentation by improving the audience sentiment over the course of the presentation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Embodiments may execute upon local computing environments or local networked environments. Embodiments may utilize cloud resources, or edge cloud resources to better enable the use of real-time audience feedback data analysis machine learning models.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
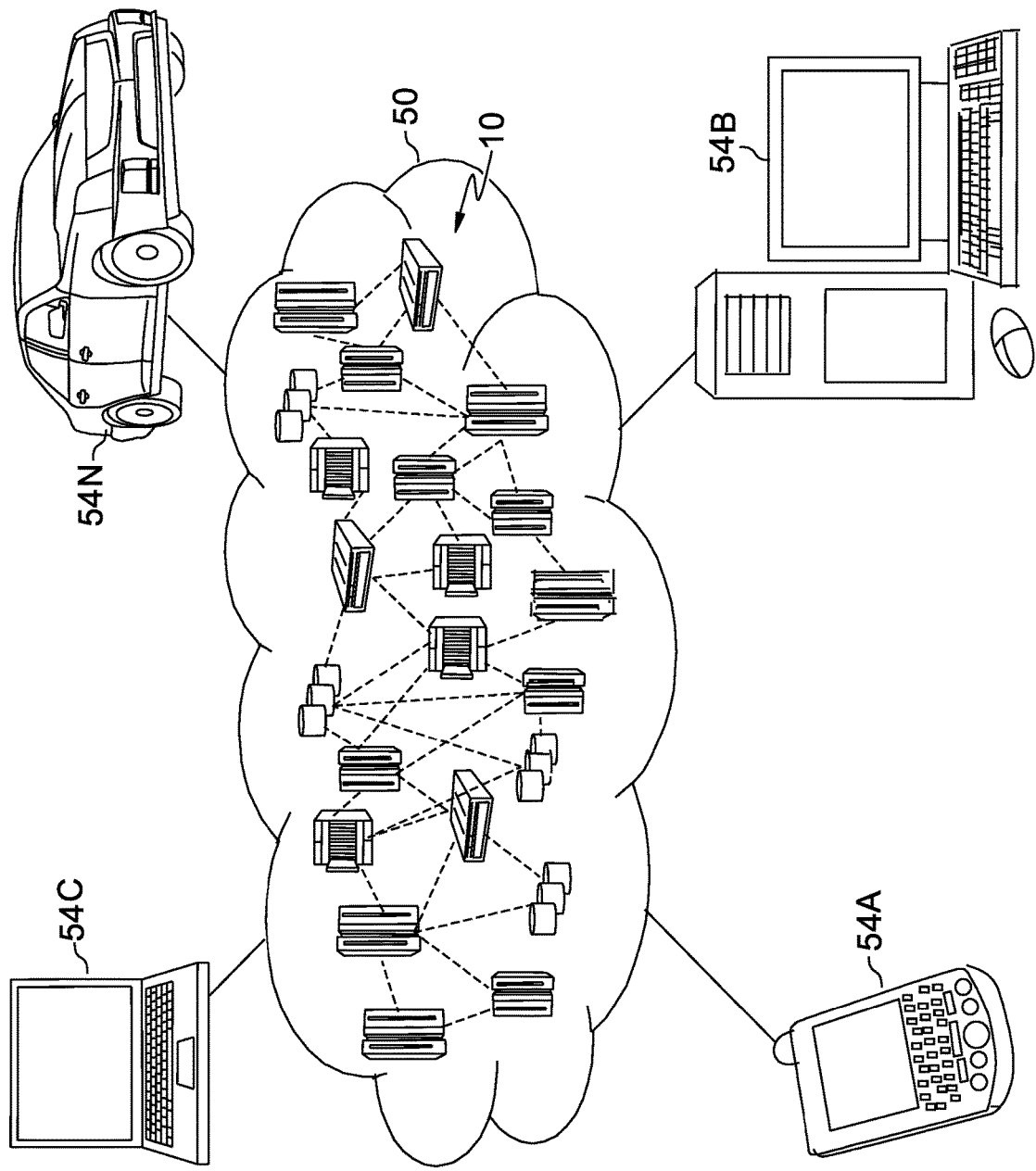
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
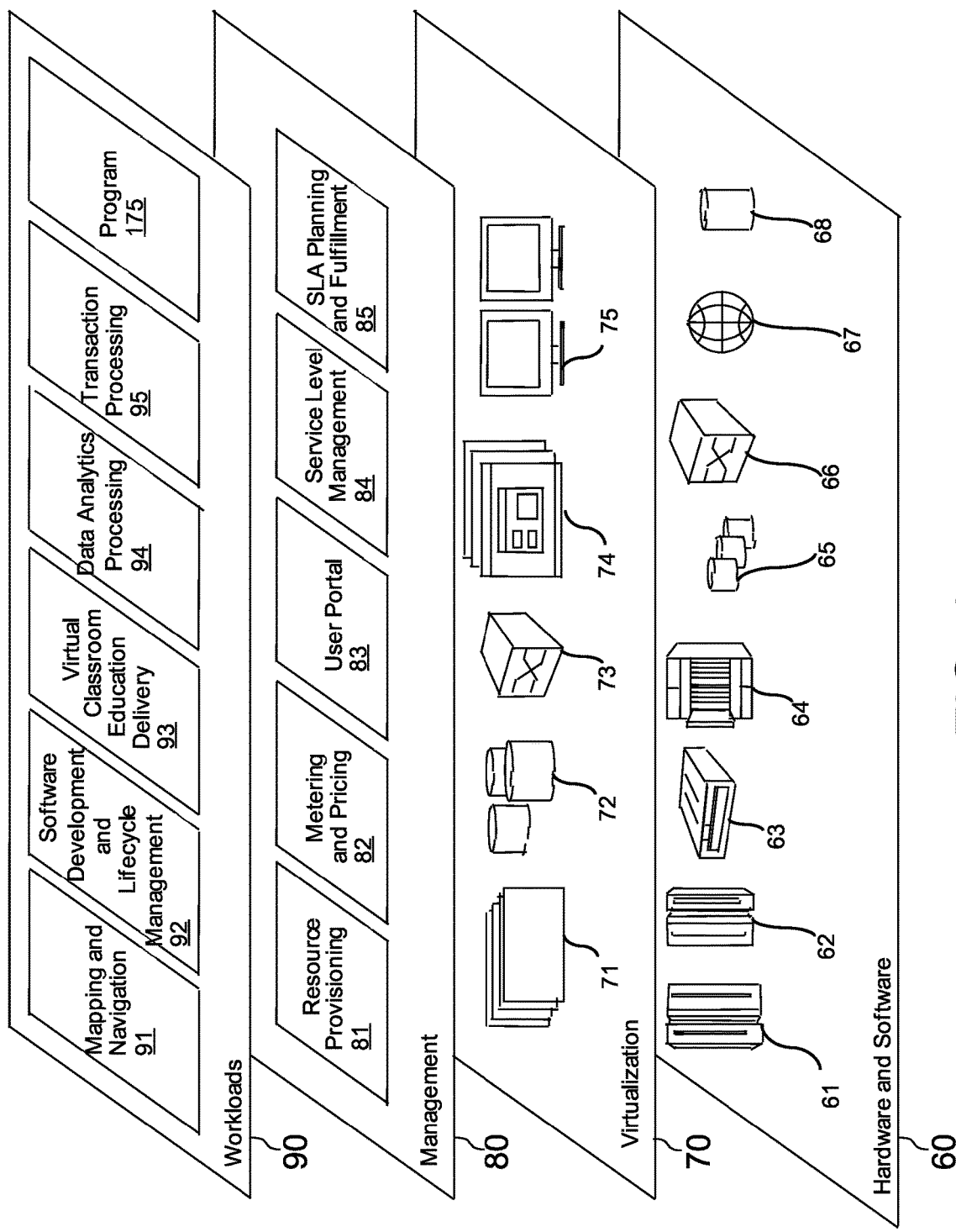
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and presentation sequencing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for altering messaging according to sentiment analysis, the method comprising:
    generating, by one or more computer processors, a baseline messaging tree including topics arranged according to a sentiment score;
    providing, by the one or more computer processors, the baseline messaging tree including topics arranged according to a sentiment score;
    providing, by the one or more computer processors, speaker prompts according to the baseline messaging tree;
    receiving, by the one or more computer processors, real-time audience sentiment feedback during a messaging presentation; and
    adjusting, by the one or more computer processors, the speaker prompts according to the baseline messaging tree and the real-time audience sentiment feedback.

2. The method according to claim 1, wherein adjusting messaging comprises:
    receiving, by the one or more computer processors, first real-time audience sentiment feedback during presentation of a first topic;
    providing, by the one or more computer processors, speaker prompts for a portion of messaging associated with a second topic according to the first real-time audience sentiment feedback;

receiving, by the one or more computer processors, second real-time audience sentiment feedback during the presentation of the portion of messaging associated with the second topic; and altering, by the one or more computer processors, the speaker prompts to transition to the second topic according to the baseline messaging tree and the second real-time audience feedback.

3. The method according to claim 1, further comprising:
providing, by the one or more computer processors, speaker prompts including regional dialect language;
receiving, by the one or more computer processors, real-time audience sentiment feedback during the presentation of the regional dialect language; and
altering, by the one or more computer processors, the speaker prompts according to the baseline messaging tree and the real-time audience sentiment feedback during the presentation of the regional dialect language.

4. The method according to claim 1, further comprising determining, by the one or more computer processors, the sentiment score according to historical topic data.

5. The method according to claim 1, further comprising:
recording, by the one or more computer processors, the messaging presentation and concurrent real-time audience sentiment feedback; and
using, by the one or more computer processors, the recording to determine a presentation topic sentiment score.

6. The computer implemented method according to claim 1, further comprising, by the one or more computer processors, receiving real-time audience sentiment feedback prior to the messaging presentation.

7. The computer implemented method according to claim 1, wherein the audience sentiment feedback comprises audience facial feature analysis.

8. A computer program product for altering messaging according to sentiment analysis, the computer program product comprising one or more computer readable storage devices and collectively stored program instructions on the one or more computer readable storage devices, the stored program instructions comprising:
program instructions to generate a baseline messaging tree including topics arranged according to a sentiment score;
program instructions to provide the baseline messaging tree including topics arranged according to a sentiment score;
program instructions to provide speaker prompts according to the baseline messaging tree;
program instructions to receive real-time audience sentiment feedback during a messaging presentation; and
program instructions to adjust the speaker prompts according to the baseline messaging tree and the real-time audience sentiment feedback.

9. The computer program product according to claim 8, wherein program instructions to adjust messaging comprise:
program instructions to receive first real-time audience sentiment feedback during presentation of a first topic;
program instructions to provide speaker prompts for a portion of messaging associated with a second topic according to the first real-time audience sentiment feedback;
program instructions to receive second real-time audience sentiment feedback during the presentation of the portion of messaging associated with the second topic; and program instructions to alter the speaker prompts to transition to the second topic according to the baseline messaging tree and the second real-time audience feedback.

10. The computer program product according to claim 8, the stored program instructions further comprising:
program instructions to provide speaker prompts including regional dialect language;
program instructions to receive real-time audience sentiment feedback during the presentation of the regional dialect language; and
program instructions to alter the speaker prompts according to the baseline messaging tree and the real-time audience sentiment feedback during the presentation of the regional dialect language.

11. The computer program product according to claim 8, the stored program instructions further comprising program instructions to determine the sentiment score according to historical topic data.

12. The computer program product according to claim 8, the stored program instructions further comprising:
program instructions to record the messaging presentation and concurrent real-time audience sentiment feedback; and
program instructions to use the recording to determine a presentation topic sentiment score.

13. The computer program product according to claim 8, the stored program instructions further comprising program instructions to receive real-time audience sentiment feedback prior to the messaging presentation.

14. The computer program product according to claim 8, wherein the audience sentiment feedback comprises audience facial feature analysis.

15. A computer system for altering messaging according to sentiment analysis, the computer system comprising:
one or more computer processors;
one or more computer readable storage devices; and
stored program instructions on the one or more computer readable storage devices for execution by the one or more computer processors, the stored program instructions comprising:
program instructions to generate a baseline messaging tree including topics arranged according to a sentiment score:
program instructions to provide the baseline messaging tree including topics arranged according to a sentiment score;
program instructions to provide speaker prompts according to the baseline messaging tree;
program instructions to receive real-time audience sentiment feedback during a messaging presentation; and
program instructions to adjust the speaker prompts according to the baseline messaging tree and the real-time audience sentiment feedback.

16. The computer system according to claim 15, wherein program instructions to adjust messaging comprise:
program instructions to receive first real-time audience sentiment feedback during presentation of a first topic;
program instructions to provide speaker prompts for a portion of messaging associated with a second topic according to the first real-time audience sentiment feedback;
program instructions to receive second real-time audience sentiment feedback during the presentation of the portion of messaging associated with the second topic; and program instructions to alter the speaker prompts to transition to the second topic according to the baseline messaging tree and the second real-time audience feedback.

17. The computer system according to claim 15, the stored program instructions further comprising:
   program instructions to provide speaker prompts including regional dialect language;
   program instructions to receive real-time audience sentiment feedback during the presentation of the regional dialect language; and
   program instructions to alter the speaker prompts according to the baseline messaging tree and the real-time audience sentiment feedback during the presentation of the regional dialect language.

18. The computer system according to claim 15, the stored program instructions further comprising program instructions to determine the sentiment score according to historical topic data.

19. The computer system according to claim 15, the stored program instructions further comprising:
   program instructions to record the messaging presentation and concurrent real-time audience sentiment feedback; and
   program instructions to use the recording to determine a presentation topic sentiment score.

20. The computer system according to claim 15, the stored program instructions further comprising program instructions to receive real-time audience sentiment feedback prior to the messaging presentation.

* * * * *